Sept. 19, 1950
S. KRASNOW
2,522,522
SHIELDING METHOD AND APPARATUS FOR
RADIOACTIVE BOREHOLE LOGGING
Filed May 3, 1941
2 Sheets-Sheet 1
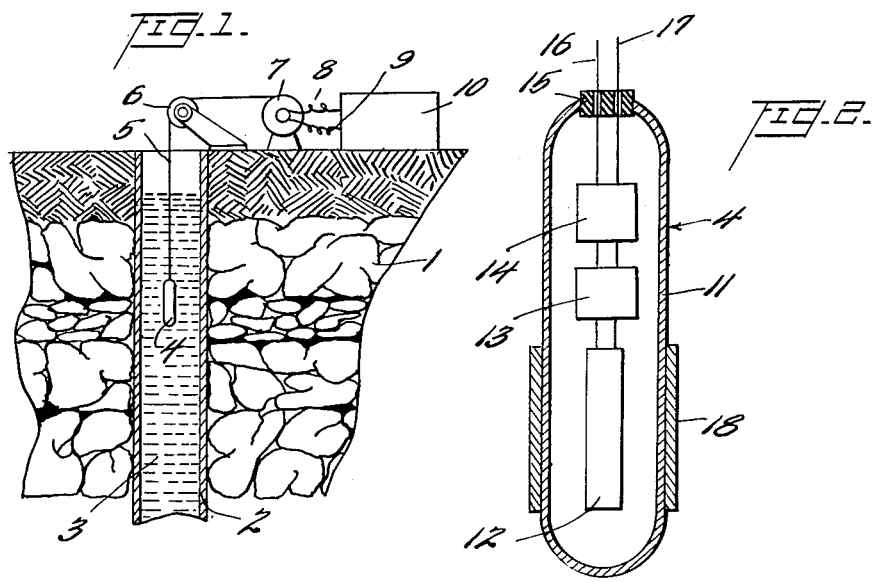
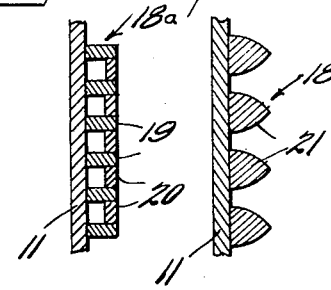
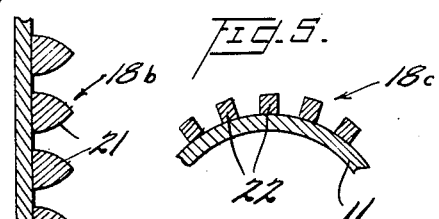
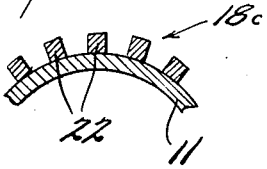
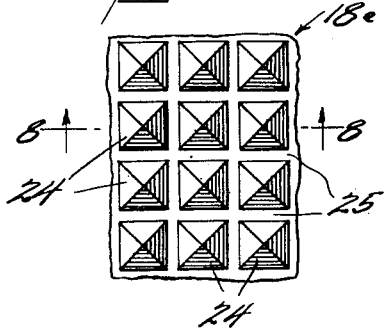
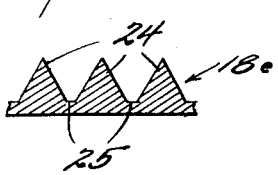

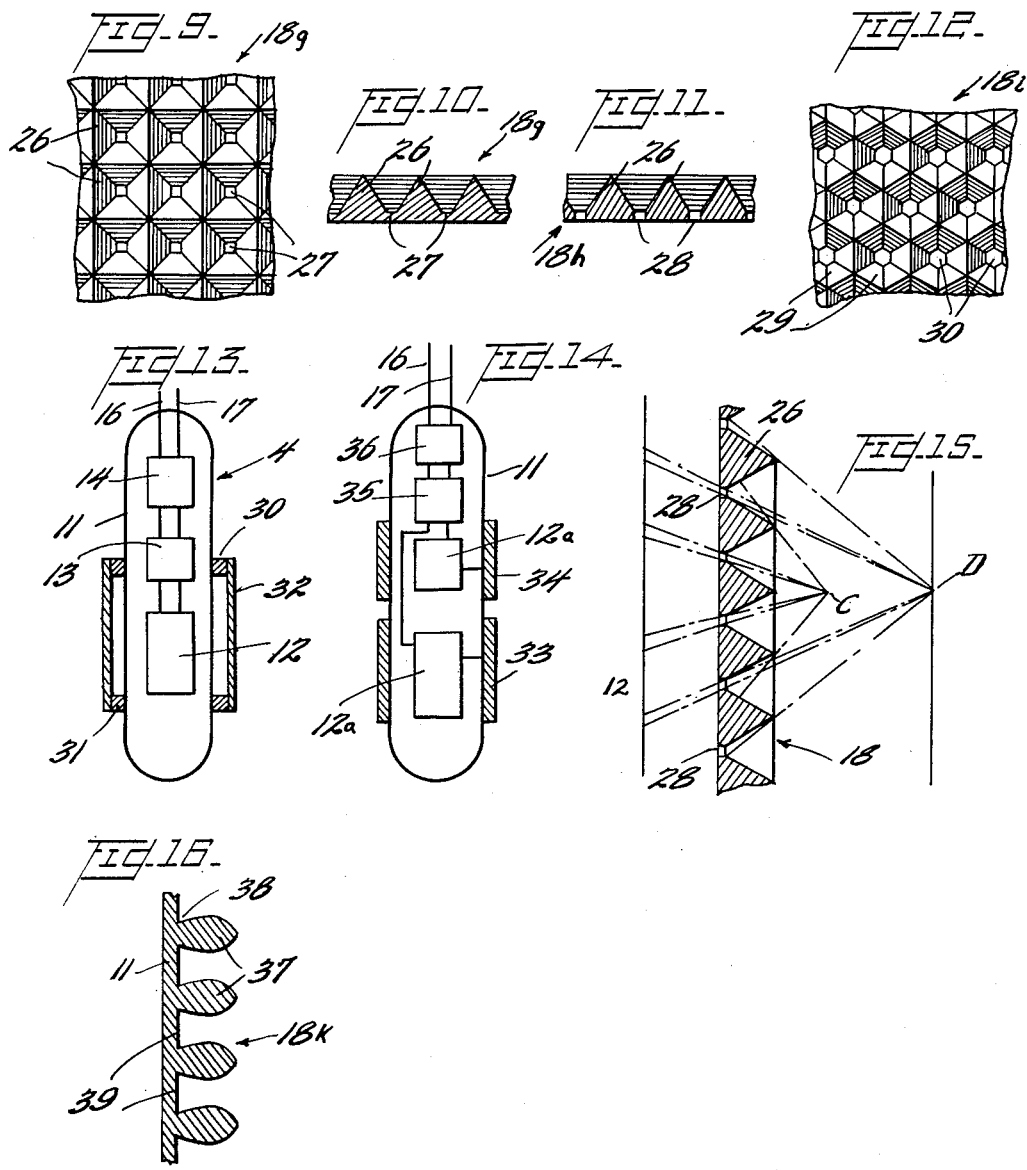

Patented Sept. 19, 1950

2,522,522

UNITED STATES PATENT OFFICE 2,522,522

SHIELDING METHOD AND APPARATUS FOR RADIOACTIVE BOREHOLE LOGGING

Shelley Krasnow, New York, N. Y., assignor to Schlumberger Well Surveying Corporation, Houston, Tex., a corporation of Delaware Application May 3, 1941, Serial No. 391,808

17 Claims. (Cl. 250—83.6)

This invention relates to apparatus and methods for facilitating the measurement of radioactivity within boreholes. In my previous work it had been shown how to lower apparatus into boreholes so as to make measurements of the radioactive properties of the material in situ in the borehole. It had been shown how this might be done by both static and dynamic means.

In the former, measurements are unrelated to the speed of movement of the radioactive measuring element, and in the latter the measurement is directly related to the speed of the movement of the measuring element.

In the measurement of radioactivity, it has been found desirable to limit the response due to nearby sources. At the same time it is found desirable to accentuate the response due to distant sources. In the usual borehole measurement of radioactivity, an elongated cylindrical instrument is lowered into the borehole. The borehole is usually filled with fluid, which may be water, drilling mud, or mixtures of oil, salt water, and other fluids. These fluids have a radioactivity of their own, since they are derived from the same general source as the rock material lining of the borehole. They will in general have a radioactivity of the same order of strength as that of most of the rock lining the borehole. It is to be remembered that the inverse square law applies here. In other words, a given radioactive source will have an effect approximately inversely proportional to the square of the distance between the source and the measuring instrument. If the borehole fluid has the same activity as the surrounding rock, it will tend to have a considerable effect on the instrument due to its nearness. It is true that the rock being of larger volume will often have a predominating effect. However, the borehole fluid will have a disturbing effect which is preferably eliminated.

A consideration of the problem will show that when a measurement is made, the effect obtained will be the sum of that due to the rock lining the borehole, and that due to the borehole fluid. To increase the accuracy of the measurement of activity of rock, it is desirable to reduce the effect due to the bore hole fluid.

It is an object of the invention to reduce the effect of the activity of the borehole fluid, and enable a measurement to be made of the activity of the rock lining the borehole. It is a further object of the invention to permit the measurement of activity of sources distant from the measuring instrument, and to reduce the effect due to sources close to the instrument.

It is a further object of the invention to enable the measurement of activity of the fluid alone, where this measurement is found desirable for correction purposes or otherwise.

In accordance with the present invention means are employed in conjunction with the apparatus for measurement of radioactive rays or any other rays used for measurement which means serves to intercept all or a portion of the rays arising from one source and to pass all or most of the rays from another source whereby the former is blanketed and the latter accentuated. Desirably the segregation or filtration of rays is accomplished based on the distance of the ray generating focus or foci from the measuring instrument, and the segregation or filtration can be utilized to accentuate the rays from a source nearer to the measuring apparatus at the expense of rays from a more distant source, or, and more desirably, the rays from the distant source can be accentuated at the expense of rays from the nearer source.

In the example shown, radioactive rays, such as gamma rays, given off by rock material within the borehole are used as an illustrative example. However, any other rays such as those arising from the atomic disintegration of material, or of naturally or artificially induced radioactivity may be utilized without departing from the spirit of the invention. It will be understood that the methods indicated and the apparatus disclosed are purely illustrative, and show a specific embodiment of the invention. Various modifications may however be made by those skilled in the art without departing from the spirit or intent of the invention.

Reference is had to the accompanying drawings in which:

Figure 1 represents a general view of the apparatus.

Figure 2 shows a schematic cross-sectional view of a portion of the apparatus shown in Figure 1.

Figure 3 shows a portion of the structure of a wall of the apparatus shown in Figure 2.

Figure 4 shows an alternative portion of wall structure.

Figure 5 shows a lateral cross-sectional view of still another type of wall structure.

Figure 6 shows an alternative type of structure similar to that shown in Figure 5.

Figure 7 shows a side view of a portion of an alternative wall structure.

Figure 8 shows a cross-sectional view of the structure shown in Figure 7, taken across line 8—8.

Figure 9 shows still another type of wall structure.

Figure 10 shows a lateral cross-sectional view of the structure shown in Figure 9.

Figure 11 shows still another type of wall structure similar to that shown in Figure 10, represented in cross-section.

Figure 12 shows still another type of wall structure, similar to that shown in Figure 9.

Figure 13 shows a vertical schematic cross-sectional view of an apparatus similar to that shown in Figure 2, with a spaced shield about the unit.

Figure 14 shows a schematic vertical cross-sectional view of an apparatus similar to that shown in Figure 2, except that plural elements are employed.

Figure 15 shows a vertical cross-sectional view of a wall structure similar to that shown in Figure 11, indicating how this structure discriminates against nearby rays.

Figure 16 shows a wall structure in vertical, partial, cross-sectional view, this structure being similar to that shown in Figure 4.

Referring now to Figure 1, rock layers typified by 1 are shown traversed by a vertical borehole which may or may not be lined with a metallic casing 2 and may or may not be filled or partially filled with liquid 3. A measuring element 4 is suspended on a cable 5 passing over a sheave 6 which may or may not be utilized to measure the length of cable 5 which has been reeled thereover. The cable is wound upon a drum 7, which has brushes and slip-rings enabling continuous contact to be made at the ends of the cable 5. Conductors 8 and 9, which may be two in number as shown or may be fewer or more than two, are shown leading into measuring, indicating, or recording apparatus indicated schematically as 10.

A vertical schematic view of the elements comprising measuring element 4 are shown in Figure 2. Here a metallic pressure resistant cartridge 11 is shown enclosing an element sensitive to radiant energy 12. The responses from this sensitive element, are amplified by an apparatus shown schematically as 13, after which the responses are made more suitable for transmission by an element shown schematically as 14.

The sensitive element may be a Geiger-Mueller counter, an ionization chamber, a photo-sensitive element, a photographic film, or any other sensitive element responsive to radiant energy, or atomic disintegration phenomena.

The transmitting element 14 will serve to place the response from the element into a form more suitable for transmission. Thus, it might further amplify the signal given off by amplifier 13. It might also alternately modulate the signal, or cause the integrated or unintegrated release of another signal. The output of element 14 passes into conductors 16 and 17 indicated as going through openings in insulator 15 affixed in a fluid-tight manner to the top of container 11. Conductors 16 and 17 may be combined into a single cable such as represented schematically as 5 in Figure 1. The details and functions of elements such as 12, 13, 14, and 10 have been adequately taught in my earlier work and need not be enlarged upon here. Mounted exteriorly on cartridge 11, so as to form an annular cylindrical member is element 18, consisting of a screen which serves to discriminate against certain of the rays passing to element 12. This screen is shown schematically in Figure 2. Its actual form may be any of several varieties hereinafter disclosed. An example is shown in Figure 3. Here separate circumferential rings 19 made of metal, driven in spaced relationship upon the outside of the cartridge 11, constitute member 18a. These rings may be made of lead, copper, steel, or other metal, depending upon the specific filtering characteristics desired. Between the annular rings 19 may be fastened other annular rings 20 made of relatively transparent material. Thus, aluminum, magnesium, beryllium, or other metal may be used, such metal having different filtering characteristics than are employed in the rings 19. Alternatively, the rings 20 may be made of the heavier metal, and the rings 19 of the lighter metal. Or either ring may be made of some non-metallic substance, the other ring being made of metallic or non-metallic material having different properties relative to radiant rays.

A suitable non-metallic material may be a plastic. Such a plastic may be utilized in its usual condition or may be filled with finely divided material causing the acquisition of different properties relative to radiant energy. As an illustrative example may be mentioned Bakelite with a filling of lead or lead salt.

Figure 4 shows a structure similar to that shown in Figure 3, except that the annular rings are of a different form, and are represented as 21. Another difference is that the rings filling the annular spaces remaining are omitted, although it is understood that such rings may be employed, being shaped in such fashion that the exterior of the member 18b will be a smooth cylinder, similar to that shown in Figure 3.

Figure 5 shows a partial cross-sectional transverse view of the element 18c. The structure here disclosed is analogous to that shown in Figures 3 and 4, except that the protruding portions are in the form of vertical ribs, each parallel to the principal axis of the cylindrical member 18c. The same remarks made in relation to the projections 19 and 21 on Figures 3 and 4 may be made relative to the projections 22 in Figure 5. The remarks made as to filling the spaces between annular rings in Figure 3 and Figure 4 may also be made in regard to filling the longitudinal depressions in Figure 5. Figure 6 shows an element 18d similar to that of Figure 5, except that the ribs are shaped in cusp-like fashion, this having advantages in operation as against the structure shown in Figure 5.

It has been found advantageous to have the member 18 provided with depressions and projecting portions in both dimensions, instead of one dimension only, as shown in Figures 3 to 6 inclusive. Figure 7 shows such a structure. The figure discloses a portion of the exterior of a member 18e, this portion being studded with square pyramids provided with spaces between the bases of the pyramids as shown. A cross-sectional view across the line 8—8 in Figure 8 shows the pyramids 24 and the depressed portions in between, represented as 25. The material of the pyramids and of the portions underlying their bases may be metal, as shown in the drawing. Alternatively, they may be of any other material having the desired absorbing properties relative to radiant rays. The spaces between the pyramids may be filled with some material different from that of the pyramids themselves, so that the exterior surface instead of appearing as a studded surface will be smooth. At the same time, the member 18e will serve the function intended. Suitable materials for the member 18e as shown in Figures 7 and 8 are lead, copper, steel, etc. as set forth above in discussion of Figure 3.

Figures 9 and 10 show the wall structure of element 18g similar to that shown in Figures 7 and 8. Here, however, the surface is provided with a set of square pyramidal indentations, truncated, as shown. The portions 27 act to admit the radioactive rays while the portions 26 serve to restrict the entrance of such rays. As in the structure in Figures 7 and 8, the indentations may be filled with any other material having different ray-absorbing properties relative to radioactive rays.

Figure 11 shows a member 18h having openings on the bottom of each pyramidal indentation. These openings permit even freer access to radioactive rays. Filling materials may be applied to the opening to prevent entrance of fluid or other undesired material, the filling substance having different ray-absorbing properties than the remainder of the structure.

Figure 12 represents an exterior view of an alternative structure applied to member 18i, the pyramidal depressions being similar to those shown in Figure 9 and Figure 10 or Figure 11, except that the pyramidal indentations are hexagonal instead of being square. The same remarks previously made relative to the wall structures in discussion of Figure 3 and Figure 7 and Figure 8 are applicable here also.

For simplicity, the members designated as 18e, 18g, 18h, and 18i, as shown in Figures 7, 8, 9, and 10, 11, and 12, respectively, have been shown as being flat. It is understood that they are merely representations of the surface of a member such as 18 in Figure 2 and that they would be formed in the shape of a cylinder, so as to enclose a cartridge such as 11. It is understood further that a radioactive measuring unit such as 4, may be of any desired shape, and the member designated generically as 18 may be of such shape as to surround the member 4. Alternately, only a portion of a measuring unit may be covered or screened with a member such as 18, in which case, the member 18 might be a flat slab or might be a convex or concave cylinder, spherical, or such other shape as is found expedient.

Figure 13 shows a structure similar to that shown in Figure 2, except that the member 18 is replaced by a cylindrical annular shield 32 spaced from the cartridge 11 by means of annular spacing rings 30 and 31. The surface of shield 32 may be provided with projecting portions as pointed out in the description of Figures 3 to 12 inclusive. It may alternatively be left smooth. It may be made of absorbing material, such as lead, or copper, or steel, or may be a material having a limited absorption, such as aluminum, magnesium, or beryllium, etc. as set forth above. The advantages of using a shield, such as 32 is that in certain boreholes, the diameter will be considerably greater than that of the cartridge 11. The borehole being filled with fluid, considerable of the radioactive rays will be absorbed in passing through the fluid to the cartridge 11. Further still, the radioactivity of the borehole fluid will manifest itself in proportion to the thickness of the fluid remaining in the annular space between the walls of the boreholes and the exterior of the assemblage 4. By using a shield, such as 32 spaced so as to reduce the volume of fluid existing between member 4 and the walls of the borehole, the fluid contained within the annulus is reduced to a minimum, and its effect is correspondingly reduced. Members such as 32 can be constructed of different diameters, depending upon the size of the borehole in which one intends to operate. By having the proper accompanying annular rings 30 and 31, a shield of proper size can be slipped over the cartridge 11 depending upon the diameter of the borehole. It is understood that the material between the shield 32 and the cartridge 11, being at all times of the same composition, will have the same effect throughout the entire borehole measurement, whereas the borehole fluid existing in the same space in the absence of the structure shown in Figure 13 would have a variable and unpredictable effect. The space between the shield 32 and the cartridge 11 may be filled with a material having a low-absorbing power relative to radioactive rays, or it may be filled with a material having a high absorbing power relative to radioactive rays. In any case, its effect will be a constant one as pointed out above. Further still, the annular space between cartridge 11 and cylinder 32 may be maintained at a pressure so as to reduce the required thickness of member 32.

Figure 14 shows plural members 12a, 12a each adapted to measure radioactivity, and each serving the function of 12 in Figure 2. The members 12a, 12a both feed into amplifying unit 35, which contains duplicate amplifiers each serving the function of the member 13 in Figure 2. Both amplifiers feed into transmitting apparatus 36 consisting of duplicate transmitting systems each serving the function of 14 in Figure 2. While the duplicate responses may be transmitted through a single pair of cables by modulating each response at a different electrical frequency, the simple expedient of utilizing a 4-wire cable in place of conductors 16 and 17 can be adopted and two responses perceived and measured at the surface by providing duplicate leads 8 and 9, duplicate slip rings for these leads, and duplicate measuring systems each such as 10.

About the lower member 12 in Figure 14, a shield 33 is placed, about the upper member a corresponding shield 34 is placed. The two shields may have different shielding properties, such as may be provided by utilizing a different material for each of the shields. Both shields may be metal, both may be non-metallic, or one may be metallic, the other being non-metallic as pointed out herein in discussion of Figures 3 and 13. Correspondingly, one shield may have a higher absorbing power for radioactive rays than the other. Further still, one shield may be made so as to admit principally rays from distant sources, the other shield being made to respond to rays from nearby sources. Thus a comparison of the radioactivities at different depths as measured radially within the borehole, may be obtained. An important application of this would be to have the shield 33, for instance, adapted to respond principally to nearby rays, such as those emanating from the borehole fluid, while the shield 34 would be constructed to admit principally distant rays such as those emanating from the rock in the walls of the boreholes. The member 12 would thus give an indication of borehole fluid radioactivity, such indications making possible the correction of the results obtained with shield 34, which results might still be affected to some degree by the borehole fluid radioactivity.

In some cases, either the shield 33 or the shield 34 might be omitted entirely, the other shield remaining. Duplicate measurements would thus be obtained in a single run down the borehole, thus obtaining two responses which might be intercompared.

The comparison of the two responses will give results which cannot be obtained by other means. Since both measurements are made simultaneously, there is a saving in time over what would have been involved in making the two measurements separately. Moreover because of an error in measurement of depth in each run, it would be difficult to correlate two results separately obtained since one would not be certain whether a given anomaly obtained with one measurement was coexistent with a similar anomaly obtained with the other measurement.

Although a shield in the form of member 18 surrounding and attached to a cartridge 11 has been described, it will be understood that this shield or screen need not take the exact form shown. Thus if one wished to take measurements within a drill pipe by lowering a radioactive measuring unit therein, a selected portion of the drill pipe would be provided with a structure such as shown in the various forms of member 18.

The metal of the drill pipe itself might be formed as shown in the various modifications of element 18, or member 18 may be fastened to surround or to lie within the drill pipe, and to be co-axial therewith. It is understood further that a cartridge such as 11 may have its exterior surface or surfaces formed to resemble the various modifications shown for element 18, and that in some cases the member 18 may be integral with the wall of a member 11, and need not be a separate element.

Figure 15 shows the mode of operation of the shields described, particular reference being had to the structure shown in Figure 11 for illustration. The operation will be the same for all modifications shown, and only one specific type need be discussed. The shield 18 is shown in partial vertical cross-section, with projections 26 and openings 28. Two typical sources are shown. C is a nearby source and D a distant one. Thus C may be a source within a borehole fluid, while D is a source within the rock lining the borehole. To the extreme left of the diagram is a measuring member, such as 12, which receives the radioactive rays and which desirably has a large area responsive to such rays. The wall of cartridge 11 has been omitted in this view for simplicity. It will be noted that the rays emanating from source C are admitted in narrow beams through the nearest openings 28. Any other rays emanating from C will find their paths obstructed by projections 26, as shown. If one now considers a source such as D, it is seen that this source can throw a beam of radioactive rays through openings 28, these openings being unavailable to source C. It is understood that emanations or rays arising from source D will also be admitted through the same openings as are available for source C. These rays have not been shown in the interests of not confusing the drawing. Since the same reasoning applies to the vertical and the lateral dimensions, it is obvious that many times the number of rays will be admitted from source D as can be admitted from source C. While it is true that the source D being farther from the measuring elements 12 will have its effect reduced, this loss will be partly compensated and in certain cases more than compensated, by the fact that rays arising from source D will be admitted in many more openings than are available to source C.

Figure 16 shows a modification of the wall structure in Figure 4, the annular rings here being undercut. The same remarks apply to this structure as apply, for instance, to Figure 4.

The measurements described, and the shielding systems employed may be utilized with any of the rays emanating from radioactive substances, whether naturally or artificially energized. They may also be applied to any of the other rays arising from the decomposition or the atomic processes in matter. Measurements may be made as shown in the invention by static or dynamic means still obtaining the advantages described herein. Measurements may also be made with any desired number of measuring elements, one or more, still obtaining the advantages of shielding, as shown herein.

All of the above explanations have been made on the assumption that the material utilized in the projecting portions of the various modifications of an element 18 is impervious to the rays being measured. This simplification is justified when the rays have little penetrating power as for instance in the case of soft gamma-rays. The same simplifications may be adopted if the material forming the projecting portions of the elements 18 has a very high absorbing power, as will be the case with such a material as lead, utilized with rays of moderate penetrating power. The more highly penetrating the rays relative to the stopping power of the shield, the less effective the shield will be in discriminating between rays from near and distant sources. If a source gives off rays of different wave lengths simultaneously, the shield will have different discriminatory powers depending upon the penetrating power of each wave length of the rays originating from the material. Thus, if the sources D and C in Figure 15 give off for example very soft and very hard gamma-rays, the shielding member 18 would discriminate very effectively as regards the soft gamma-rays, reducing those emanating from sources C and admitting those arising from source D. However, the hard gamma-rays emanating from source C would not be discriminated against so effectively since the material forming the projections 26 would be partially transparent to such rays. There would be a discriminatory effect depending upon distance, but this fact would not be so pronounced as was noted for the soft gamma-rays. It is thus seen that the shielding member 18 will have a combined effect, serving to discriminate both as to wave length and as to distance. In cases where the apparatus is to be utilized in borehole radioactive measurements, it will often be found desirable to make the projecting members 26 in Figure 15 and the corresponding projections in the other modifications of highly absorbing material such as lead, so that there will be a discriminatory effect related to distance even for hard gamma-rays.

As stated previously, the intensity of radioactivity at a point due to a distant source is inversely proportional to the square of the distance between the point and the source. However, with extended sources, such as exist in measurements in boreholes, and with the use of new type of shield described herein, it is possible to obtain the equivalent effect of another law of variation of intensity. Thus, with the shield described, for example, since nearby sources are discriminated against in greater measure than distant sources, an inverse first power law may be approximated, By a still further extension of this principle, it is even possible to obtain an effect such that the intensity will vary directly as the distance instead of inversely.

In cases where it is desired to discriminate against distant sources, the present apparatus can produce an effect even more pronounced than the inverse square effect. Thus by a proper selection of shape of a shield, one might obtain the effect of an inverse cube law.

The principle described herein is of value in making measurements in places other than in boreholes. Thus, it is often desired to compare the strengths of radioactive preparations in the laboratory, these preparations being placed close to the apparatus. At the same time, the walls and floor of the laboratory, as well as the air within the laboratory are all contaminated with radioactive material and provide a "background" against which the measurement must be made. This background reduces the precision of the measurements. By the selection of a shield which discriminates against distant sources, the accuracy of such laboratory measurements may be increased. Alternately, where it is desired to measure rays from distant sources and to ignore those nearby, the alternate type of shield here disclosed may be utilized with an increase in the accuracy of measurement.

As is well known in the radiant energy art, materials have scattering powers, which are different for different materials. Thus, a metal when struck by gamma rays will give off radiant energy, in some cases in the form of softer gamma rays, and in some cases in the form of long X-rays or even visible light. Since the shields disclosed herein are utilized in such manner that the rays must pass through them, it is obvious that they will in turn give off other rays.

In selecting the material of the shield, whether the shield be smooth, or whether it be corrugated as shown in the various modifications of shield 18, the material chosen may be such that the desired scattering power or power to emit secondary radiation of a desired sort may be utilized. Thus, brass is well known as having certain secondary ray emitting properties when struck by X-rays or gamma rays. If a brass shield is utilized, the thickened portions of it will give rise to softer rays than originally impinged upon it. If the shield is so constructed that distant rays pass through the thickest portions, then the production of secondary rays will be richest for those rays originating from a distance. If desired, the shield 18 may have another element, such as the material of cartridge 11, interposed between it and the measuring element. If the cartridge is made of thin, but highly absorbing material, it can serve to exclude softer rays. Thus, rays from a distance may be converted into softer rays and excluded by further filtering. The rays not excluded will be of their original hardness and will suffer little diminution.

While the scattering above referred to relates to the production of softer rays excited by hard ones, such as X-rays or gamma rays, it will be realized that scattering relates also to the geometrical distribution of the new rays. Thus, when an original ray strikes the material of a shield such as 18, new rays are given off in a sort of cone with the apex at the point of production of these new rays. In other words, the new ray will not proceed necessarily in the same straight line as the original ray, but will in general proceed at an angle thereto. It is well known that certain crystals have the faculty of giving off secondary rays at known definite angles to the incident rays. If a shielding member such as 18e is made up of such crystal material, it will be known that all rays impinging at a certain angle will give off new rays bearing a known geometrical relation thereto. The projecting members need not be a single solid crystal, but may be molded of a pulverized mass of crystals, and may further be coated with a material to protect this molded mass. As an example of a crystalline material which will serve may be mentioned sodium chloride.

It is thus seen that means are provided for conversion of rays to rays of other wave lengths, the conversion being selective so as to apply chiefly to rays from distant sources. As is obvious, the process may be inverted, and the conversion made greatest for rays from nearby sources by using the alternative type of shield disclosed herein.

The types of construction disclosed herein may be utilized to great advantage even in cases in which selective absorption related to distance is not desired. It is noted that the modifications disclosed utilize corrugated surfaces. These surfaces are stronger for their weight than smooth flat or smooth cylindrical surfaces. In many cases, the apparatus will be lowered into a fluid-filled borehole, in which pressure of the order of several thousand pounds per square inch and even as much as 10,000 pounds per square inch are common. If a smooth cylindrical casing is adopted for such apparatus, it will be most likely to fail by collapsing. The weight of the material can be more efficiently distributed by providing either circumferential ridges, longitudinal ridges, or a combination of both. All of these forms have been disclosed. It is thus possible to obtain a greater mechanical strength with the same quantity of material, or looked at differently, the same mechanical strength with the use of less material. Since the material has an absorbing power proportional to the thickness thereof traversed by the rays, it is obvious that the less material utilized, the less absorption. This principle may be applied not only to the outer element of a cartridge such as 11, but may be applied to the measuring elements themselves. Thus, the outer wall of an ionization chamber such as disclosed in my earlier work, or the outer electrode of a Geiger-Müller counter may be made in the same way. In some cases, the outer cylindrical metal electrode of a Geiger-Müller counter can form the outer wall of the counter element. In such cases, the construction described above is of particular advantage, giving the effect of a thinner cylinder, at the same time preserving mechanical strength. In the latter case, when a metallic outer cylinder is used, and a pressure below atmospheric is further used, this mode of construction will have particular application. It is understood that in cases in which an ionization chamber is used, with its outer wall subjected to atmospheric pressure and its inner wall subjected to pressure of several hundred pounds per square inch, the pressure will be such as to tend to burst the wall. However, the construction specified will still be of advantage.

In cases in which it is desired to utilize the principle disclosed immediately above, and to obtain a maximum mechanical strength with a minimum of absorbing material, it is understood that the equivalent of element 18 will be made as thin as is consistent with mechanical strength. This is in contradistinction to the use of this principle in shielding alone, in which the material chosen for the outer shield is selected more with a view to its absorbing properties than to mechanical strength. Further still, the wall is sometimes made thicker than is required for mechanical strength, in order to obtain the requisite shielding effects. However, in certain cases the mode of construction adopted for mechanical strength, will at the same time serve as a distance selective shield.

The remarks made above as to mechanical strength apply with full force to the use of drill pipe as ordinarily utilized for well drilling. Such drill pipe does not have to be pressure resistant only, it must resist tension, compression, and torsion. Such strength can be embodied in an element, at the same time reducing its weight and its consequent absorbing properties relative to radioactive rays. The use of vertical ribs, such as disclosed in Figures 5 and 6 herein, or the use of a combination of vertical and horizontal ribs such as disclosed in Figures 9 and 12 herein will provide the necessary strength so as to allow serviceability as drill pipe, at the same time lowering the weight, a feature of advantage from many viewpoints, and further lowering the absorption of radioactive rays.

Even where the apparatus is not required to stand great internal pressures, and even where it is to be used in air, the construction disclosed herein has advantages as regards strength. The apparatus will still have to be strong enough to withstand accidental blows, and stresses imposed by its own weight. In some cases, where especially thin walls are desired, to withstand atmospheric pressure only, this construction still has the advantage of providing a lowered absorption without a sacrifice in mechanical strength. This principle might therefore be applied in apparatus to be utilized above ground, and equipment to be utilized in the laboratory.

The shapes disclosed herein may be produced in any of the usual fashions common in the mechanical arts. Thus, if plastics are utilized, ordinary molding techniques will be used. In other cases, the material can be cast by the usual foundry techniques. In still other cases where soft metals are utilized, the shape can be rolled into the metal. In other cases, the metal can be removed by standard machine techniques. In the case of the type of shield shown in Figure 12, the pyramidal indentations can be substituted by conical ones which constitute a fairly close approximation, and are somewhat easier to produce by standard means.

The scope of the invention is indicated by the appended claims.

I claim:

1. In an apparatus for measuring radioactivity within a borehole, a measuring system, sensitive to radioactivity, and adapted to be lowered within the borehole, a shield mounted adjacent the said system, so as to be traversed by rays emanating from material within the borehole, the said shield having portions facilitating the entrance of rays originating distant from the said shield, and having other portions restricting the entrance of rays from material close to the said shield.

2. In an apparatus for measuring the radioactivity of materials within a borehole, a measuring apparatus, adapted to receive rays originating within the borehole, and a shield, the shield being mounted adjacent to the said apparatus so as to intercept rays passing to the said apparatus, the shield further having portions discriminating against rays arising at a distance from the said shield.

3. In a method of measuring radioactivity within a deep narrow borehole, the steps of lowering a member sensitive to radioactivity within the borehole, so as to receive and indicate the radioactive rays originating at a desired locality within the borehole, of substantially reducing the effect of rays arising from material close to the measuring element relative to rays arising from distant material, of making a similar measurement without the reduction of effect of nearby rays, the two measurements so made giving information concerning the relative radioactive properties of the different materials within the borehole.

4. In an apparatus for measuring radioactivity within a borehole, a shielding element, the said shielding element having portions limiting the number of rays passing therethrough, and originating from nearby sources, the said shielding element having other portions allowing rays from distant sources to enter relatively freely, the said shielding element being adapted to be mounted adjacent to a radioactive measuring system, so as to bestow upon the said system a selective property enabling the emphasis of radioactivity from distant sources.

5. In an apparatus for measuring radioactivity within a deep narrow borehole, a member sensitive to radioactivity, and a shield, the shield being mounted adjacent to the said member so as to intercept at least a portion of the rays passing to the said member, the shield having substantially pyramidal depressions, the said depressions facilitating the entrance of rays from a remote point, and restricting the entrance of rays from points close to the said detector.

6. A shield for use in radioactive measurements, and adapted to be placed adjacent to a radioactive measuring member between a dispersed source of radioactivity and a measuring element sensitive to radioactivity, said shield having a plurality of protuberances, having walls at an angle to the incident radioactive rays, the said protuberances serving to facilitate the entrance of rays from a distant point, and to restrict the entrance of rays from a nearby point.

7. In an apparatus for measuring radioactivity within a deep narrow borehole, a cartridge of substantially cylindrical form, a member sensitive to radioactivity mounted upon the said cartridge, and adapted to be lowered with the said cartridge into the borehole, a shielding member of substantially cylindrical form, mounted coaxial to the said cartridge, and adjacent thereto, so as to intercept at least a portion of the radioactive rays passing to the said sensitive member, the said shielding member having a series of portions facilitating the entrance of radioactive rays from distant points, and having further portions restricting entrance of rays from nearby points.

8. In an apparatus for measuring radioactivity within a borehole, a shielding member adapted to intercept rays originating within the borehole and passing to a sensitive member, the said shielding element having a corrugated surface, the raised portions of the said corrugated surface serving to discriminate against, and at least partially shield from, rays originating from points close thereto, the depressed portions of the corrugated surface serving to facilitate the entrance of rays originating from distant points, the said shield serving as a discriminatory system, discriminating against rays originating from nearby points.

9. In an apparatus for measuring radioactivity within a borehole, a holder adapted to be lowered within the borehole, a sensitive member, adapted to measure radioactivity, and a distance discriminating shield, the said sensitive member being mounted upon the holder so as to be lowered therewith to desired localities within the borehole, the said shield being mounted upon the holder adjacent to the said sensitive member, so as to intercept rays passing to the said sensitive member, the distance-discriminating properties of the said shield enabling the measurement of radio-active intensity of sources distant therefrom, with a reduction of disturbance due to radioactive sources close thereto.

10. A shield for radioactive measurements and adapted to be placed adjacent to a radioactive measuring member between a dispersed source of radioactivity and a measuring element sensitive to radioactivity, said shield having wedge shaped portions, the faces of the said wedges being inclined relative to the incident rays when the shield is in operating position, the slope of the wedge faces allowing the easy entrance of rays originating from distant points, the material constituting the wedge serving to absorb rays emanating from points close thereto.

11. In a shield for use in making radioactive measurements, a piece of material having radioactive-ray absorbing properties, and adapted to be placed so as to intercept the radioactive rays passing to a measuring element, the said piece having a series of raised and depressed portions, the said combination of raised and depressed portions providing absorbing portions serving to exclude at least a portion of the rays arising from nearby points, so as to give a distance-discriminating effect.

12. In a method of measuring radioactivity within a borehole in which a fluid exists, the steps of making a measurement whose value is generally dependent upon the radioactivity of the borehole fluid, of making a similar measurement of radioactivity chiefly of material excluding the borehole fluid, of correcting the second-named measurement by means of data obtained in the first-named measurement thereby obtaining a more accurate indication of radioactivity of sources exterior to the borehole fluid.

13. In an apparatus for measuring radioactivity of weak sources, a measuring member sensitive to radioactive rays emanating from the said sources, a shielding member placed adjacent to the measuring member and adapted to intercept at least a portion of the radioactive rays passing to the measuring member, the surface of the intercepting means having protruding portions and depressed portions, the protruding portions serving to discriminate against rays emanating at a certain distance, the depressed portions serving to facilitate admission of rays from other distances, thereby obtaining a measure of radioactivity of the weak sources, relatively unaffected by contaminating radioactivity from other sources.

14. In a method of measuring the intensity of radiant energy from a radiant energy source, the intensity of the received energy being inversely proportional to the square of the distance from the source, the steps of interposing absorbing material so as to absorb rays arising from a certain distance, the said absorbing material being dispersed in irregular and discontinuous fashion, the interstices between the portions of absorbing material serving to facilitate the entrance of rays, the entire assemblage thereby serving to cause the measuring element to respond other than inversely as the square of the distance.

15. In an apparatus for measuring radioactivity within a deep narrow borehole, a cartridge adapted to be lowered into the borehole, a member sensitive to radioactivity mounted within said cartridge, a shielding member adjacent to said cartridge so that all rays passing to the sensitive member must traverse said shielding member, the said shielding member having a series of portions facilitating the entrance of radioactive rays from distant points, and having further portions restricting entrance of rays from nearby points.

16. In an apparatus for measuring radioactivity within a deep narrow borehole, a cartridge adapted to be lowered into the borehole, a member sensitive to radioactivity mounted within said cartridge, a shielding member adjacent to said cartridge so that all rays passing to the sensitive member must traverse said shielding member, the said shielding member having a series of raised and depressed portions, the combination of raised and depressed portions providing absorbing portions serving to exclude at least a portion of the rays dependent on the distance of the points of origin of said rays.

17. In an apparatus for measuring radioactivity within a borehole, in which a disturbing fluid exists, a holder adapted to be lowered within the borehole, a member sensitive to radioactivity mounted upon the said holder and adapted to be lowered therewith, a shielding member placed adjacent to the said sensitive member and adapted to intercept rays passing to the said sensitive member, means spacing the said shield from the holder so as to maintain it at a distance therefrom, the said means being tightly fastened to the said holder and shield with a fluid tight fastening so as to exclude fluid between the shield and holder whereby the thickness of the fluid existing between the holder and the radioactive sources at the time the measurement is made will be reduced, thereby reducing the effects of the borehole fluid upon the radioactive measurement.

SHELLEY KRASNOW.

REFERENCES CITED

The following references are of record in the file of this patent:

UNITED STATES PATENTS

| Number | Name | Date |
| --- | --- | --- |
| 1,164,987 | Bucky | Dec. 21, 1915 |
| 1,208,474 | Caldwell | Dec. 12, 1916 |
| 1,447,430 | Richardson | Mar. 6, 1923 |
| 1,471,081 | Waite | Oct. 16, 1923 |
| 2,133,776 | Bender | Oct. 18, 1938 |
| 2,197,453 | Hassler | Apr. 16, 1940 |
| 2,220,509 | Brons | Nov. 5, 1940 |